United States Patent [19]

vanVonno

[11] Patent Number: 5,331,921
[45] Date of Patent: Jul. 26, 1994

[54] SHOULDER-MOUNTED BIRD PERCH HAVING REMOVABLE WASTE COLLECTING RECEPTACLE

[76] Inventor: Karl T. vanVonno, 31 Valencia Cir., Safety Harbor, Fla. 34695

[21] Appl. No.: 40,856

[22] Filed: Mar. 31, 1993

[51] Int. Cl.⁵ ............................................. A01K 31/12
[52] U.S. Cl. ............................................. 119/26; 2/46
[58] Field of Search .................. 119/24, 25, 26; 2/2, 2/16, 46

[56] References Cited

U.S. PATENT DOCUMENTS

| | | | |
|---|---|---|---|
| 910,298 | 1/1909 | Lindemann | 119/26 |
| 2,720,188 | 10/1955 | Hofrichter | 119/26 |
| 2,731,949 | 1/1956 | Arnould | 119/26 |
| 2,808,807 | 10/1957 | Winton et al. | 119/26 |
| 4,807,568 | 2/1989 | Perry et al. | 119/26 |
| 4,919,081 | 4/1990 | Lewellen | 119/26 |

Primary Examiner—Gene Mancene
Assistant Examiner—Todd E. Manahan
Attorney, Agent, or Firm—Jerry C. Lyell

[57] ABSTRACT

A shoulder-mounted bird perch comprising a flexible shoulder cover, a perch assembly mounted upon the shoulder cover and a demountable waste receptacle also mounted upon the shoulder cover to the rear of the perch assembly. The perch assembly includes a wooden dowel or rod upon which a bird can perch. The waste receptacle is shaped to collect and hold bird droppings and is easily demountable for cleaning.

3 Claims, 2 Drawing Sheets

SHOULDER-MOUNTED BIRD PERCH HAVING REMOVABLE WASTE COLLECTING RECEPTACLE

BACKGROUND OF THE INVENTION

There have been numerous devices manufactured for the purpose of enabling bird owners, and in particular parrot owners, to carry their birds by allowing the birds to perch on the owner's shoulder in some manner or other. Most such products consist of a shoulder cover made of terry cloth or like material. Some of these products feature pockets to catch bird droppings.

Bird droppings are problematic because of the fluid character of the waste material. The existing shoulder covers typically absorb bird droppings and then have to be washed or they shed said droppings which tend to flow off the ends of the cover. In either case the covers have to be washed frequently.

The present invention addresses the problems of bird droppings with a combination of features that controls the position of the bird within a range as desired by the owner and provides for collection of droppings in a manner that is neat and efficient.

SUMMARY OF THE INVENTION

The present invention is a bird perch which can be mounted on the shoulder of a person. This invention is especially suitable for the handling of parrots which allow themselves to be carried by their owners.

The apparatus consists of a flexible shoulder cover to which is affixed a flexible support means, an adapter, and a wooden dowel or like object upon which the parrot can perch. The perch is capable of limited movement about a longitudinal axis in relation to the normal forward motion of a person. The perch is further capable of being shifted to the left or right with respect to the support means in order to move the parrot's range of movement closer to or farther away from the person's head. The natural tendency of the bird is to remain on the elevated perch rather than any other position on the person's shoulder.

The shoulder cover is further fashioned with a demountable receptacle which is positioned to catch the parrot droppings. These droppings are typically a very messy fluid material. The receptacle is removably attached to the shoulder cover just behind the perch and it can be formed from a length of metal or plastic tube. The top of the tube is slotted or open along its entire length such that material from the tube can be flared upward along each side of the slot and along the entire length of tube in order to channel bird droppings into the main body of the tube. The ends of the tube are capped to prevent fluid matter from escaping. This configuration of the tube also aids in reducing spillage when the user is removing the apparatus for cleaning or storage.

BRIEF DESCRIPTION OF THE DRAWINGS

The invention may be further understood by reference to the drawings in which.

FIG. i is a top view as the device appears when laid out flat.

DESCRIPTION OF THE PREFERRED EMBODIMENT

Figure 1:
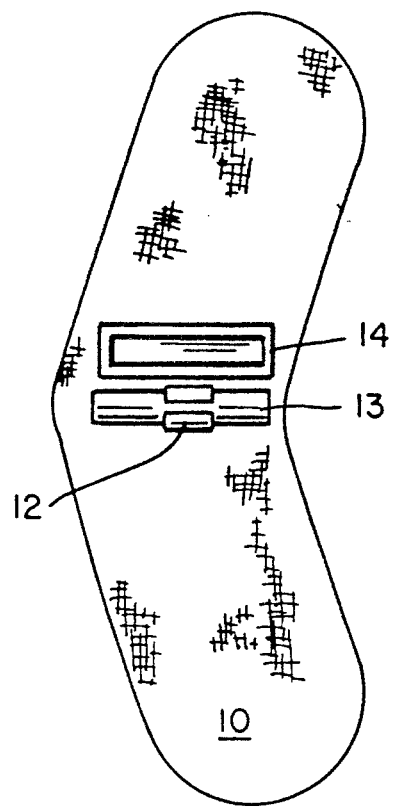
Figure 2:
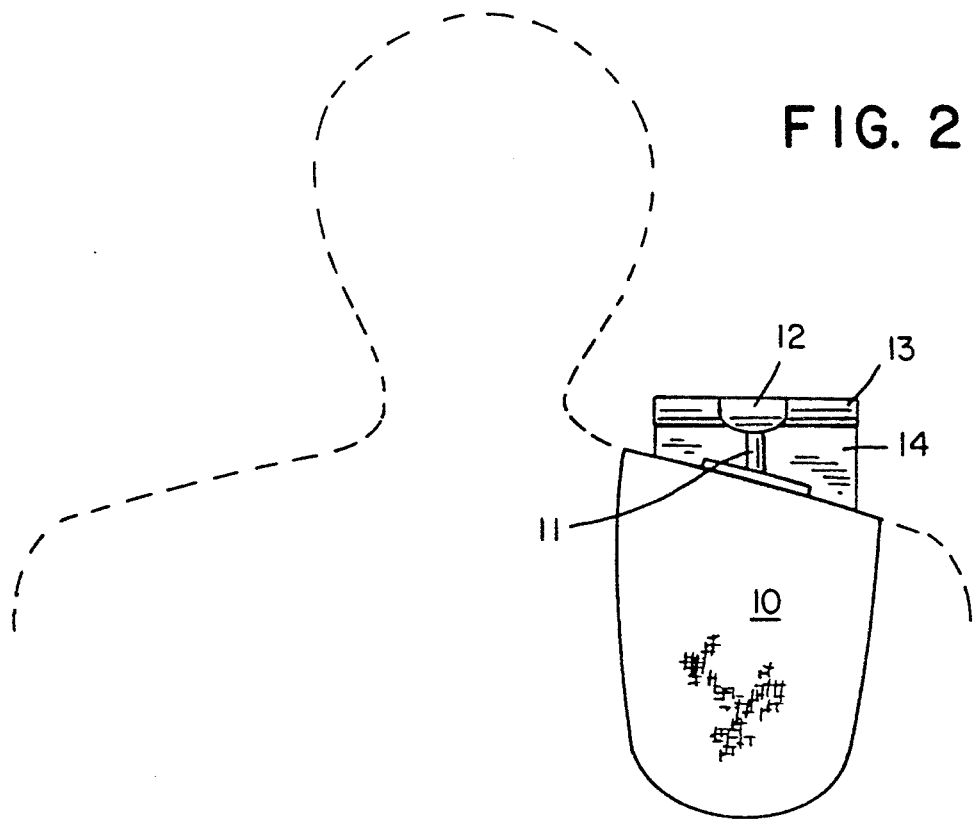
FIG. 2 is a front view of the device.

Referring now to FIGS. 1 and 2 of the drawings, one embodiment of the invention is shown wherein a flexible shoulder cover 10 is configured to fit onto a person's shoulder so that the front and rear halves drape in a comfortable manner. In the center of said cover is mounted a perch assembly comprising a flexible support post or means 11, and an adapter 12 that is configured to grip a segment of wooden dowel or rod-like material 13. On the segment of the cover that drapes to the rear of the person's shoulder is mounted a receptacle 14 such that said receptacle is positioned to catch droppings from a bird that may be perched upon dowel 13.

Said support means 11 can be constructed of materials that are old in the art, preferably stiff wire or the like which is capable of retaining a shape and supporting the weight of a bird without further deformation or bending. The flexibility of support means 11 enables the user to tilt the adapter 12 and dowel 13 through small angular displacements about a longitudinal axis in relation to the forward motion of the user. Adapter 12 can be fabricated from polymeric/elastomeric materials that are old in the art and is configured to grip dowel 13 with moderate pressure. This allows the dowel 13 to be shifted to the left or right in order to move the bird's range of movement closer to or farther away from the person's head as desired.

Figure 3:
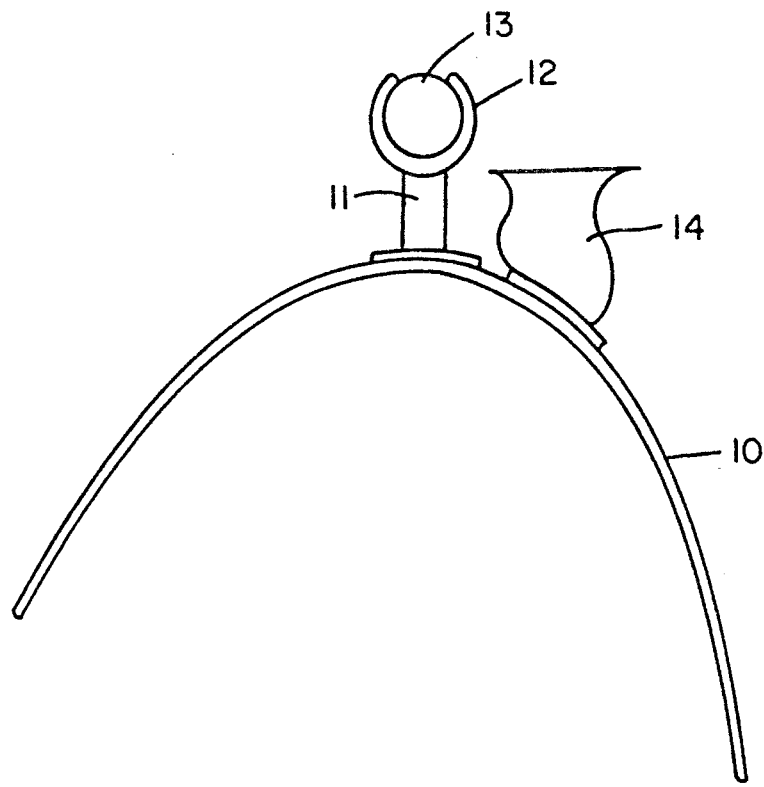
FIG. 3 is a side view of the device.
Figure 4:
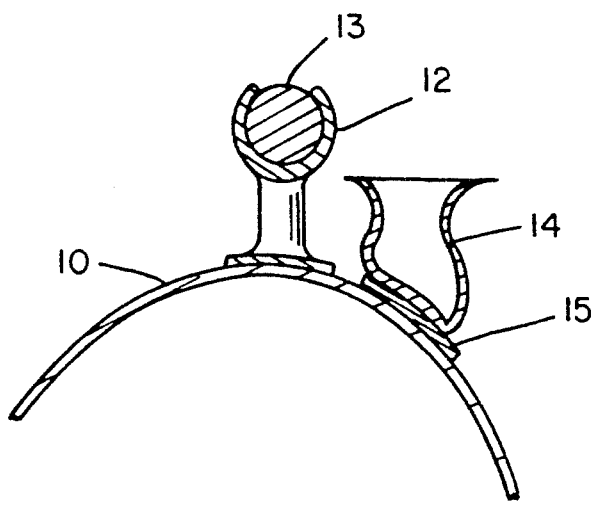
FIG. 4 is a cross section taken through the shoulder cover, support means, perch, and receptacle.

Receptacle 14 has a cross sectional shape similar to a chamber pot as shown in FIGS. 3 and 4 in order to channel bird droppings into said receptacle and to reduce spillage of waste matter when the person bends forward, backward or sideways. Said receptacle can be fabricated from extruded polymers or stamped and rolled metals with the cross sectional shape as shown. The ends of the cross sectional shape are capped to prevent material from flowing out. Receptacle 14 is demountable and can be secured to cover 10 by means of velcro fastener materials 15 or the like. This feature enables the user to easily remove the receptacle for cleaning.

The general configuration of this device and materials of fabrication can vary without departing from the spirit of the invention.

I claim:

1. A shoulder-mounted bird perch comprising:
   a flexible cover adapted to fit onto a person's shoulder having front and rear segments for draping to the front and rear, respectively, of the person's shoulder,
   a bird perch assembly mounted in the center of said flexible cover between the front and rear segments thereof, and
   a demountable waste receptacle mounted upon the rear segment of said flexible cover.

2. The device as recited in claim 1 wherein said bird perch assembly consists of a flexible support post, an adapter mounted upon said flexible support post, which adapter is configured to grip rod-like objects, and a segment of rod-like material held by said adapter.

3. The device as recited in claim 1 wherein said waste receptacle is attached to said flexible cover by means of VELCRO fastener materials.

* * * * *